July 13, 1965  W. H. PAYNE  3,194,568
STUFFING BOX WITH COOLING AND VENT MEANS
Filed June 16, 1961  2 Sheets-Sheet 1

INVENTOR
William H. Payne
BY Popp and Sommer
ATTORNEY

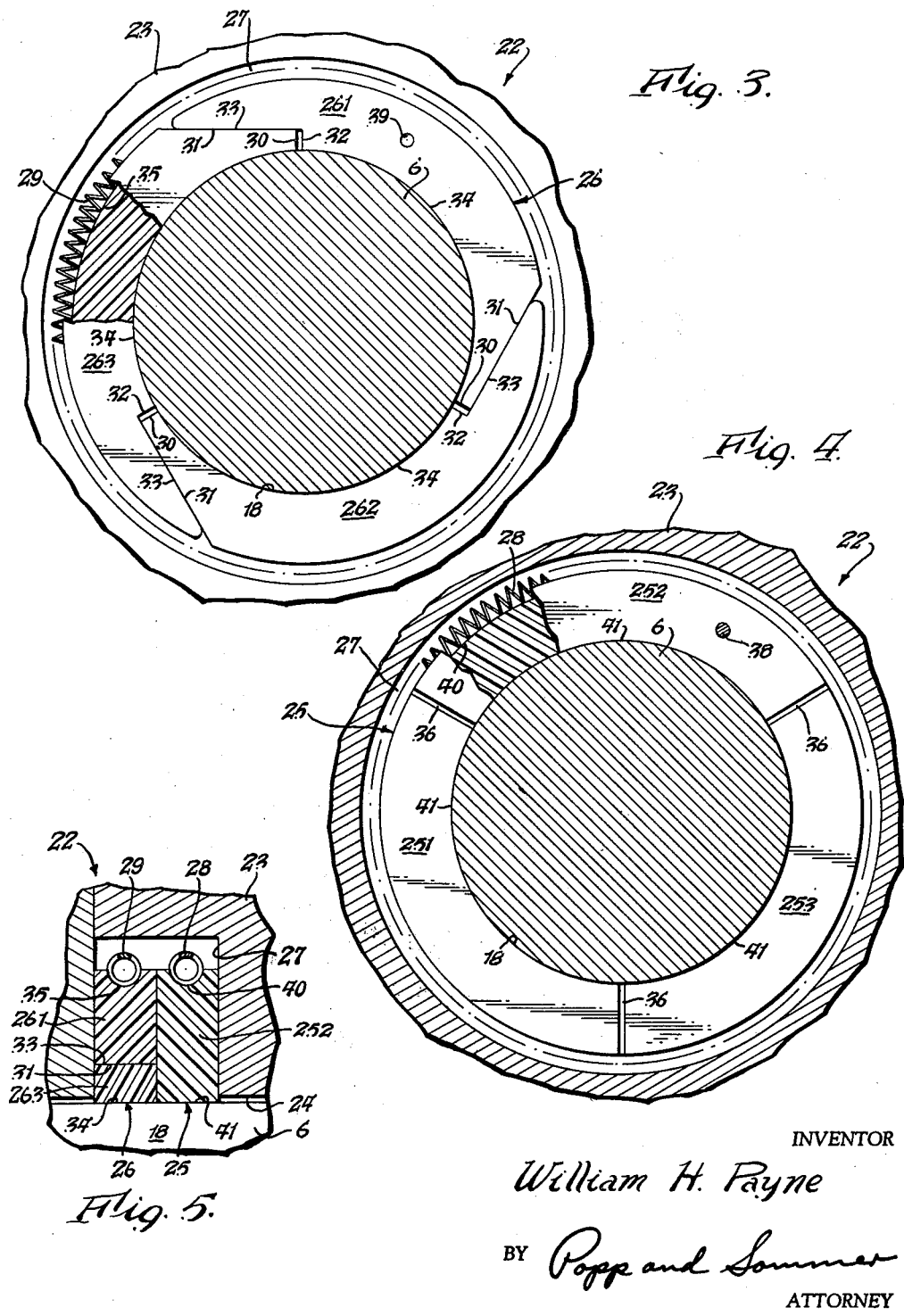

United States Patent Office 3,194,568
Patented July 13, 1965

3,194,568
STUFFING BOX WITH COOLING AND
VENT MEANS
William H. Payne, Olean, N.Y., assignor to Dresser Industries, Inc., Dallas, Tex., a corporation of Delaware
Filed June 16, 1961, Ser. No. 117,537
3 Claims. (Cl. 277—68)

This invention relates to improvements in the construction of a stuffing box, and more particularly to an oil-free stuffing box construction for the piston rod of a compressor for compressing "bone-dry" gas such as oxygen or nitrogen. "Bone-dry" is defined herein as virtually complete absence of water vapor.

Heretofore, carbon-graphite formulations have been conventionally used for oil-free compressor services but are valueless when "bone-dry" gases are encountered. This is because the lubricity or self-lubricating quality of carbon or graphite is dependent upon the fine film of moisture which adheres to the surface of each minute particle of carbon or graphite. Extremely dry atmospheres cause this lubricating film of moisture to evaporate. The unlubricated graphite or carbon particles are very hard and have an abrasive effect on the metal surface of piston rods.

More recently, certain plastic formulations have been devised which combine such filler materials as graphite and glass fibers with long chain fluorinated polymers of ethylene. One of these polymers in present wide usage is tetrafluorethylene, known under one trademark as Teflon. These formulations do not depend on adhered moisture for self-lubrication and thus are useful for compressor piston rod packing rings operating in "bone-dry" atmospheres. However, prior to the advent of the present invention, the use of filled tetrafluorethylene was confied to compressors operating at uneconomically low piston speeds or low pressure, or both. This practice has been necessary because of the difficulty of removing the heat of friction from the rubbing surface of the filled tetrafluorethylene packing rings. Tetrafluorethylene formulations are good heat insulators so that the only way heat can be removed is through the contact surface between the packing ring and piston rod. When piston rod motion is slow, the rate of heat generation is slow because of the extremely low co-efficient of friction between the filled tetrafluorethylene in the ring and the polished steel of which the piston rod is composed, but unless the heat is removed so that the temperature remains below approximately 500° F. the coefficient of friction increases rapidly and quickly results in complete failure. At low piston speed or low pressure, or both, the heat is generated at a rate slow enough to be removed through conduction and radiation from the surface of the piston rod without the surface becoming too hot to maintain the surface of the filled tetrafluorethylene rings below the aforementioned critical temperature. Such speeds are uneconomical because of the costly compressors and costly drivers required to compress a given volume of "bone-dry" gas.

Accordingly, the primary object of the present invention is to provide a stuffing box construction which permits the heat of friction generated between the rubbing surface of the piston rod and the packing ring to be removed rapidly thereby permitting the packing ring to operate in a cooler environment and below the critical temperature of about 500° F. in the case of a filled tetrafluorethylene ring, and also thereby to permit higher and more economical compressor piston speeds and pressures. This is accomplished in accordance with the present invention by circulating a cooling fluid such as cool water through the packing, around the piston rod in intimate contact therewith. Heat is thus removed directly from the rod surface. Water which wets and adheres to the rod surface further aids cooling with its latent heat of vaporization as it approaches the "bone-dry" atmosphere of a compressor cylinder. Provision is made for venting the vapor formed from water which adheres to the rod surface and is carried under packing ring surfaces. The extremely small amount of water vapor which may escape being vented and thus may enter the gas in the compressor is so minute in comparison to the large gas volume as not to be deleterious to the particular gas being compressed.

Another object of the invention is to provide such a stuffing box construction which is simple and therefore economical, and which can be readily disassembled and reassembled for maintenance or replacement purposes should this be required.

Other objects and advantages of the invention will be apparent from the following detailed description of a preferred embodiment thereof illustrated in the accompanying drawings in which:

FIG. 3 is a fragmentary vertical transverse sectional view thereof taken on line 3—3 of FIG. 1.

FIG. 4 is a fragmentary vertical transverse sectional view thereof taken on line 4—4 of FIG. 1.

FIG. 5 is an enlarged fragmentary view of one of the packing devices shown in FIG. 1 surrounding the piston rod.

Figure 1:
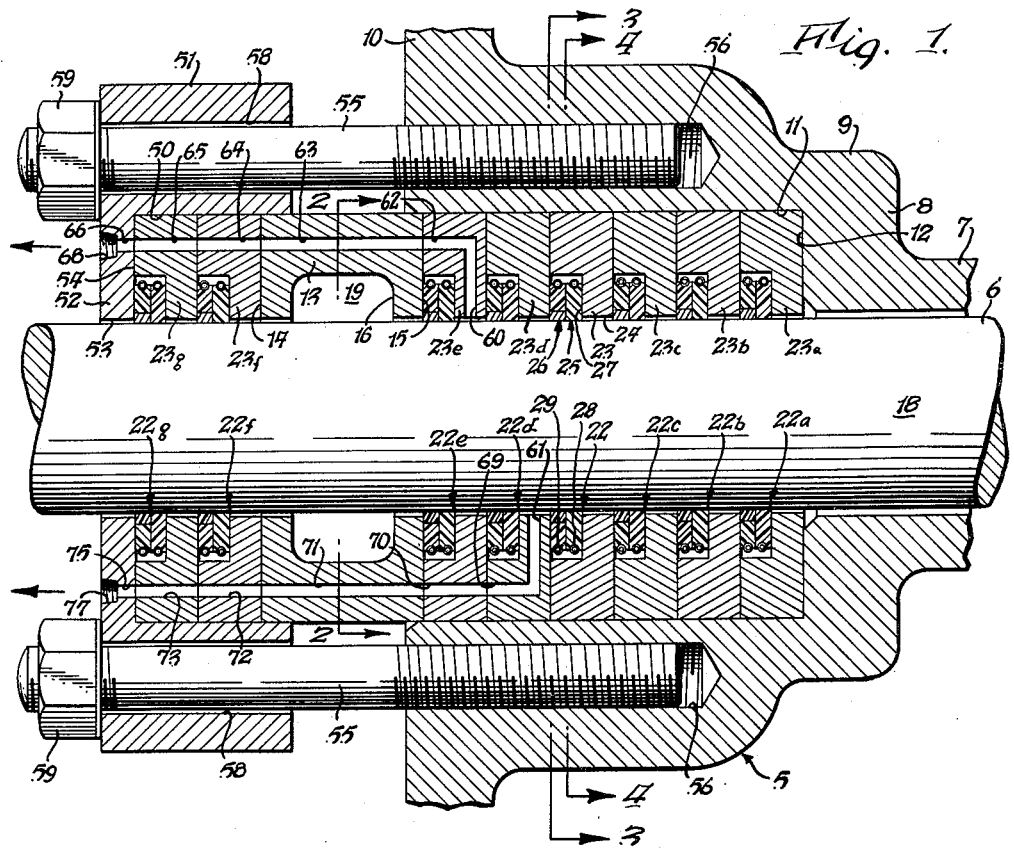
FIG. 1 is a fragmentary central sectional view through a hollow end head structure for a compressor cylinder and through which structure a reciprocal piston rod extends, and showing the sliding joint between the piston rod and end head as being provided with a stuffing box construction embodying a preferred form of the present invention.

Referring to the drawings, and particularly to FIG. 1, the numeral 5 represents generally the hollow, internally cooled, end head structure for a compressor cylinder (not shown) in which a piston (not shown) is reciprocated by a cylindrical piston rod 6 suitably connected thereto. Only the stepped outer wall of such hollow end head structure is illustrated and then only fragmentarily. As shown, such stepped outer wall includes an inner cylindrical tubular portion 7 which surrounds part of the periphery of the elongated piston rod 6 in closely spaced relation thereto, an inner radial portion 8 extending radially outwardly from the outer end of tubular portion 7, an intermediate cylindrical tubular portion 9 of larger diameter than the portion 7 but concentric therewith and extending axially outwardly from the outer margin of the radial portion 9, and an outer radial portion 10 extending radially outwardly from the outer end of the intermediate tubular portion 9. The inner surface of this intermediate tubular portion defines a cylindrical cavity 11 open at its outer end but having an inner end wall 12 formed by the axially facing outer surface of the inner radial portion 8.

The stuffing box construction embodying the present invention is partially arranged within the recess 11 in the end head structure 5. As shown, such stuffing box construction includes a ring member 13 which surrounds the piston rod 6. This member has radially extending, axially facing end faces 14 and 15 and is further formed intermediate said end faces with an internal annular groove 16. The groove 16 is essentially closed by that portion of the cylindrical periphery 18 of the piston rod 6 which is opposite the groove at any given time. Thus, the grooved member 13 jointly with the piston rod 6 form a chamber 19.

Figure 2:
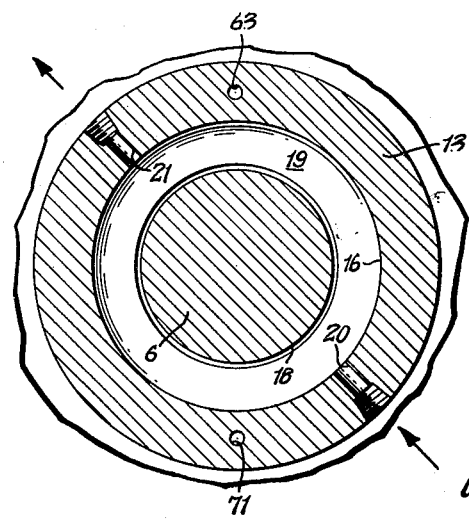
FIG. 2 is a fragmentary vertical transverse sectional view thereof taken on line 2—2 of FIG. 1.

Cooling fluid, preferably a liquid such as water, is circulated through the chamber 19 so as to contact the peripheral surface 18 of the piston rod 6. For this purpose, the ring member 13 is shown in FIG. 2 as having a radial inlet passage or hole 20 which extends through the central outer wall of the ring member 13. Similarly, on the diametrically opposite side of the ring member the same is shown as provided with a second radial passage or hole 21 which serves as an outlet for the chamber 19. The outer ends of the holes 20 and 21 are shown as formed with internal threads to receive piping (not shown) for conducting the cooling fluid to and from ring member 13. The source of cooling fluid may be that desired as well as the type of fluid employed.

Axially confined or compressed packing means are shown as arranged on axially opposite sides of the ring member 13. Such packing means include a plurality of packing devices severally indicated generally at 22, 22a, 22b, 22c, 22d, 22e, 22f and 22g. Six such devices, 22, 22a–22e are shown as arranged on the high pressure side of the ring member 13 or that side thereof which is adjacent the cylinder (not shown), and two such devices, 22f and 22g, are shown on the opposite or low pressure side of this ring member.

Inasmuch as these various packing devices are similar in construction, only the device 22 will be described as representative. The packing device 22 is shown as comprising a flat and parallel sided, cylindrical packing cup 23 having a central cylindrical hole 24 through which the piston rod 6 extends. This hole 24 is counterbored to provide an axially facing shoulder 27 which faces away from the cylinder (not shown) or to the left as viewed in FIG. 1. Arranged within the counterbore of the packing cup 23 is a packing ring assembly comprising a first ring 25 disposed adjacent the shoulder 27, a second ring 26, a garter spring 28 for the ring 25 and a second garter spring 29 for the ring 26. A radial clearance is shown between the peripheries of the rings 25 and 26 and the surrounding counterbore wall of the cup 23.

Referring to FIG. 3, the ring 26 is shown as comprising three flat and parallel-sided segments 261, 262 and 263. The corresponding end of each of these segments has a radial end surface 30 extending outwardly from the inner periphery part way toward the outer periphery. The same end of each of these segments has a flat surface 31 which intersects the outer periphery at an angle to the tangent and also intersects the flat radial end surface 30 at a substantially right angle. The opposing end of each of the segments 261, 262 and 263 is provided with a radial end surface 32 opposing, parallel and slightly spaced from the end surface 30 on the adjacent segment. The outer end of this end surface 32 is connected by a flat surface 33 leading to the periphery of the segment at right angles to the surface 32.

The surfaces 31 and 33 of adjacent segments 26 are flat, parallel, overlapping and slidably contact each other. The corresponding opposing end surfaces 30, 32 and 31, 33 provides a right angle joint one leg of which leads to the inner periphery of the ring 26 and the other leg of which leads to the outer periphery of this ring. It will be seen that if the ring 26 is urged to contract or reduce its circumference, its surfaces 31 and 33 slide upon each other while the surfaces 30 and 32 tend to approach each other. The inner part-cylindrical peripheral surface 34 of each of the segments in the ring 26 is adapted to engage the cylindrical peripheral surface 18 of the piston rod 6.

Each of the segments 261, 262 and 263 in its respective outer periphery has a groove 35 which extends in a circumferential direction so that the grooves 35 jointly provide an annular groove in which the garter spring 29 is partially arranged. The purpose of this spring 29 is constantly to urge the segments in the ring 26 toward a contracted condition into intimate contact with the piston rod periphery 18.

Referring to FIG. 4, the ring 25 comprises a series, three in number, of flat and parallel-sided segments 251, 252 and 253. The circumferential ends of the segments in the ring 25 terminate in flat radial surfaces, opposing pairs of which are slightly spaced apart and provide a radial joint 36. The ring 25 faces toward the source of pressure which is on the right as viewed in FIG. 1.

The two rings 25 and 26 are oriented with respect to each other so that the ring angle joints in the ring 26 are intermediate the radial joints 36 in the ring 25. Means are provided for maintaining this circumferential orientation of the rings 25 and 26 and to prevent relative shift. For this purpose one of the segments in the ring 25, specifically the segment 252, is shown as having a pin 38 projecting axially toward the segment 261 in the other ring 26 and received in a hole 39 provided therein.

The segments in the ring 25 are also provided severally with grooves 40 in their outer peripheries which extend in a circumferential direction and which jointly provided an annular groove in which the garter spring 28 is partially arranged. This garter spring tends to contract the ring 26 so that the inner part-cylindrical surface 41 of each of its segments intimately engages the cylindrical peripheral surface 18 of the piston rod 6.

The segments in the rings 25 and 26 are preferably made of tetrafluoroethylene filled with graphite or glass fibers so that the rubbing surfaces 34 and 41 of these rings are self lubricating.

The packing devices on the pressure side of the ring member 13 and comprising the devices 22 and 22a–22e, are arranged within the cavity 11 in the end head structure 5 with the inner axially facing end face of the packing device 22a engaging the outwardly facing radial shoulder 12. The other two packing devices 22f and 22g are arranged on the opposite side of the ring member 13. As shown, part of the ring member 13 is arranged within the cavity 11 and the opposite end portion is arranged within the cylindrical cavity 50 of a cup-shaped retainer 51 having at its outer end a radial end wall 52 provided with a central cylindrical hole 53 through which the piston rod 6 extends in closely spaced relation thereto. It will be seen that the inner flat radial surface 54 of the end wall 52 engages the outer axially facing end face of the packing device 22g. The outer axially facing end face of the packing device 22e engages the end face 15 of the ring member 13. The inner axially facing end face of the packaging device 22f engages the end face 14 of the ring member 13.

The various packing devices stacked upon one another on opposite sides of the ring member 13 are adapted to be clamped together. For this purpose, the end head structure 5 is shown as carrying two or more circumferentially spaced studs 55 which extend axially outwardly from the end head structure 5. These studs are shown as having externally threaded inner ends which are screwed severally into internally threaded recesses 56 provided in the end head structure 5. The opposite or outer end portions of these studs 55 extend through openings or holes 58 provided in the retainer ring 55 and the outer extremities of these studs are externally threaded to receive severally nuts 59 which bear against the outer end face of the retainer ring 51. By tightening the nuts 59 the stack of packing devices, with the intermediately disposed ring member 13, can be firmly clamped against the shoulder 12.

It is not such clamping action which effects the seal between the various pairs of packing rings such as the rings 25 and 26. Rather it is the pressure of the gas working outwardly over the piston rod 6 through the slight radial clearances provided between the rod surface 18 and the tubular portion 7, and the packing cups such as 23. Considering the cup 23 and rings 25 and 26 as representative, pressurized gas leaking outwardly from the compressor cylinder (not shown) through the packing cup hole 24 is effective against the right hand radial side of the ring 25 and against the external peripheries of both rings 25 and 26. This forces the ring 25 axially firmly against the ring 26 which in turn is pressed against the radial side of the packing cup 23d. The ring 26 operates to seal the radial joints 36 in the ring 25. Both the ring 25 and the radial wall of the packing cup 23d, between which the ring 26 is pressure clamped, operate to seal the right angle joints in the ring 26. The pressure of the gas also operates to supplement the urging of the garter springs 28 and 29 in forcing the rings 25 and 26 to contract about the piston rod 6 and thereby force the rubbing surfaces 34 and 41 of the respective segments of these rings into firm, effective sealing engagement with the peripheral rod surface 18.

As previously indicated, it is desired to keep these rubbing surfaces at a temperature below about 500° F. This is done by introducing a suitable cooling fluid such as cool water into the chamber 19 through the inlet 20 so as to intimately contact the peripheral surface 18 of the piston rod 6 in heat exchange relationship therewith. The fluid flows out through the outlet 21. A water film may adhere to the rod periphery 18 and be carried under the packing devices 22e and 22d on the pressure side of the ring member 13. Inasmuch as the rod 6 will be heated due to the friction generated by the rod surface 18 rubbing over the internal peripheral surfaces 34 and 41 of the various sealing rings 25 and 26 and by the gas being compressed in the compressor, this heat can be utilized to vaporize such adhering moisture.

Vent means are provided to remove such water vapor to prevent its entrainment in the gas being compressed within the compressor cylinder (not shown). While such vent means may be variously constructed, as shown they comprise a first radial passage 60 and a second radial passage 61, axially spaced from the first. Both passages are communicable with the periphery 18 of the piston rod 6 and are shown as arranged on diametrically opposite sides thereof.

As shown, the radial passage 60 is formed in the packing cup 23e for the packing device 22e. The outer end of this radial passage 60 communicates with an axial passage 62 also formed in the cup 23e. The ring member 13 and the packing cups 24f and 24g are severally shown as provided with alined, axially extending passages or through holes 63, 64, 65, respectively. The outer end of the hole 65 communicates with a through hole 66 provided in the end wall 52 of the ring retainer 61. The outer end of this passage 66 is shown as being enlarged and internally threaded as indicated at 68 for the reception of piping or tubing (not shown) which may lead to the place desired. It is preferred that the vent 60 communicate with the atmosphere so as to vent the water vapor collected therein to the atmosphere.

The other vent hole 61 is shown as formed in the packing cup 23d of the packing device 22d. The outer end of this radial bore 61 communicates with an axially extending passage 69 also formed in the cup 23d. The packing cup 23e, the ring member 13 and the packing cups 23f and 23g are severally provided with alined, axially extending through passages 70, 71, 72 and 73, respectively, which communicate with the passage 69. The outer end of the passage 73 communicates with an axially extending through hole 75 provided in the end wall 52 of the ring retainer 51. The outer end of this hole 75 is shown as enlarged and internally threaded as indicated at 77 to permit of the attachment of a pipe or tubing (not shown).

Preferably, the vent hole 61 which is closer to the compressor cylinder (not shown) than the other vent hole 60, is connected to a suitable subatmospheric pressure or suction producing means (not shown). The advantage of this is to promote the vaporization of any water adhering to the rod periphery 18 which escapes being vaporized and vented through the first encountered vent hole 60.

The stuffing box construction is such that it can be readily disassembled, by loosening the nuts 59 and removing the retainer ring 51, to permit examination or replacement of any of the internal parts such as the packing devices 22, 22a–22g and the ring member 13, for maintenance purposes. In reassembling the stuffing box, the various passages 62–66 for the vent hole 60 and the passages 69–75 for the vent hole 61 can be alined by inserting probe elements or rods (not shown) into these passages through the end holes 66 and 75 in the end wall 52 of retainer ring 51, to assure that these various passages communicate properly. Thereafter the nuts 59 can be tightened and these alined rods (not shown) removed. Any connections of pipes or tubing (not shown) to the threaded recesses 68 and 77 can be restored.

From the foregoing, it will be seen that the preferred embodiment of the invention accomplishes the various objectives stated. Modifications of the preferred embodiment may occur to those skilled in the art. Accordingly, the embodiment shown and described is illustrative and not limitative of the invention the scope of which is to be measured by the appended claims.

What is claimed is:

1. In a stuffing box construction for a relatively reciprocable rod having a peripheral surface, the combination comprising means providing an annular chamber arranged to surround said rod and communicate with said surface thereof, inlet and outlet means independent of said rod arranged to conduct cooling liquid through said chamber for contact with said surface, and packing means on axially opposite sides of said chamber means, one of said sides being a high pressure side, that one of said packing means on said high pressure side having a passage communicable with said surface within the confines of said one of said packing means for venting vapor formed from liquid adhering to said surface.

2. In a stuffing box construction for a relatively reciprocable rod having a peripheral surface, the combination comprising means providing an annular chamber arranged to surround said rod and communicate with said surface thereof, inlet and outlet means arranged to conduct cooling liquid through said chamber for contact with said surface, and packing means on axially opposite sides of said chamber means, one of said sides being a high pressure side, that one of said packing means on said high pressure side having a first passage communicable with said surface within the confines of said one of said packing means for atmospheric venting vapor formed from liquid adhering to said surface; and also having a second passage communicable with said surface within said confines but axially spaced from said first passage on the side thereof remote from said chamber means for subatmospheric venting vapor formed from liquid adhering to said surface.

3. In a stuffing box construction for a relatively reciprocable rod having a peripheral surface, the combination comprising a ring member arranged to surround said rod and having an internal annular groove communicable with said surface, inlet and outlet means arranged to conduct cooling liquid through said groove for contact with said surface, packing means on axially opposite sides of said ring member and including a plurality of packing cups and a packing ring assembly arranged within each of said cups, one of said sides being a pressure side, and first and second independent passage means severally communicable with said surface through separate ones of said packing cups located on the pressure side of said ring member for venting vapor formed from liquid adhering to said surface.

References Cited by the Examiner
UNITED STATES PATENTS

| | | | |
|---|---|---|---|
| 448,874 | 3/91 | Brewer | 277—1 |
| 849,115 | 4/07 | France | 227—70 X |
| 941,394 | 11/09 | West | 277—16 |
| 1,900,437 | 3/33 | Durham | 277—71 X |
| 1,933,678 | 11/33 | Morterud | 277—69 X |
| 2,143,637 | 1/39 | Vollmann | 277—15 X |
| 2,223,519 | 12/40 | Hornschuch | 277—22 |
| 2,563,971 | 8/51 | Stein | 277—15 X |
| 2,731,285 | 1/56 | Cummings | 277—157 |

FOREIGN PATENTS

| | | |
|---|---|---|
| 577,388 | 6/24 | France. |
| 315,789 | 6/30 | Great Britain. |

EDWARD V. BENHAM, *Primary Examiner.*

MORRIS M. FRITZ, SAMUEL ROTHBERG,
*Examiners.*